United States Patent
Uradnisheck

(10) Patent No.: US 7,642,301 B2
(45) Date of Patent: Jan. 5, 2010

(54) POLY (HYDROXYALKANOIC ACID) COMPOSITIONS WITH IMPROVED TOUGHNESS, DIMENSIONAL STABILITY AND STRETCHABILITY

(75) Inventor: Julius Uradnisheck, Glen Mills, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 318 days.

(21) Appl. No.: 11/899,806

(22) Filed: Sep. 7, 2007

(65) Prior Publication Data

US 2009/0069509 A1    Mar. 12, 2009

(51) Int. Cl.
*D21H 19/58*    (2006.01)
(52) U.S. Cl. .............. 524/51; 524/52; 524/53; 524/230; 524/548
(58) Field of Classification Search ............. 524/51, 524/52, 53, 230, 548
See application file for complete search history.

(56) References Cited

U.S. PATENT DOCUMENTS

| | | | |
|---|---|---|---|
| 6,417,294 B1 | 7/2002 | Obuchi et al. | |
| 7,268,190 B2 * | 9/2007 | Ohme et al. | 525/400 |
| 7,550,541 B2 * | 6/2009 | Ohme et al. | 525/400 |
| 2004/0242803 A1 | 12/2004 | Ohme et al. | |
| 2005/0131120 A1 | 6/2005 | Flexman | |
| 2006/0045940 A1 | 3/2006 | Tweed et al. | |
| 2006/0173133 A1 | 8/2006 | Flexman et al. | |
| 2006/0263394 A1 | 11/2006 | Oyama et al. | |
| 2007/0003774 A1 | 1/2007 | McDaniel | |
| 2007/0054073 A1 | 3/2007 | Tweed et al. | |
| 2007/0116909 A1 | 5/2007 | Tweed et al. | |
| 2007/0213466 A1 | 9/2007 | Uradnisheck | |
| 2007/0260019 A1 * | 11/2007 | Ohme et al. | 525/400 |

FOREIGN PATENT DOCUMENTS

| | | |
|---|---|---|
| EP | 1445282(A1) | 8/2004 |
| JP | 9316310 | 12/1997 |
| WO | WO 01/23473(A1) | 4/2001 |
| WO | 2008/154527 A1 | 12/2008 |

OTHER PUBLICATIONS

U.S. Appl. No. 60/934,050, filed Jun. 11, 2007, Uradnisheck.
U.S. Appl. No. 60/947,172, filed Jun. 29, 2007, Uradnisheck et al.

* cited by examiner

*Primary Examiner*—Bernard Lipman

(57) ABSTRACT

Disclosed are poly(hydroxyalkanoic acid) compositions comprising a poly(hydroxyalkanoic acid), an ethylene ester copolymer, and an aliphatic carboxylic acid amide.

25 Claims, No Drawings

POLY (HYDROXYALKANOIC ACID) COMPOSITIONS WITH IMPROVED TOUGHNESS, DIMENSIONAL STABILITY AND STRETCHABILITY

FIELD OF INVENTION

The invention relates to thermoplastic compositions comprising a poly(hydroxyalkanoic acid) having improved toughness, dimensional stability, and stretchability.

BACKGROUND OF THE INVENTION

Poly(hydroxyalkanoic acids), also known as polyhydroxyalkanoates, have gained great attention in the plastics industry because they can be produced from renewable monomers. Because these polymers are biodegradable they have been proposed for use in a broad range of applications. However, physical limitations such as brittleness and slow crystallization may limit the applications of poly(hydroxyalkanoic acids). Numerous impact modifiers have been developed in the past to improve the toughness of poly(hydroxyalkanoic acids). For example, Japanese Patent No. 9316310 discloses a poly(lactic acid) resin composition comprising a modified olefin compound as an impact modifier. U.S. Patent Application Publication No. 2006/0173133 discloses a toughened poly(hydroxyalkanoic acid) composition wherein an ethylene ester copolymer (e.g., a terpolymer having copolymerized units of ethylene, butyl acrylate and glycidyl methacrylate (EBAGMA)) is used as an impact modifier. In addition, various nucleating agents have been developed to increase the crystallinity or rate of crystallization for poly(hydroxyalkanoic acid) compositions and therefore improve the dimensional stability and thermal resistance thereof. For example, U.S. Pat. No. 6,417,294 discloses the use of an aliphatic carboxylic acid amide (e.g., behenamide) as a nucleating agent for poly(lactic acid).

In general, when poly(hydroxyalkanoic acid) is used to manufacture thermoformed packaging articles, such as cups, trays, and clam shells, the resin is first melt extruded and rapidly cooled (i.e. generally for less than 5 seconds) to a temperature below the glass transition temperature of the polymer on a rotating quench drum to form a nearly transparent sheet (herein called Rapidly Quenched Sheet). The sheet is then further formed into finished articles under higher temperature conditions (above the glass transition temperature of the polymer). The term "Rapidly Quenched Sheet" as used herein also encompasses thin sheets, i.e. films, for example of thickness of 10 mils (0.25 mm) or less.

Rapidly Quenched Sheet of poly(hydroxyalkanoic acid), however, often lacks the stretchability that is required for acceptable processability on continuously moving equipment. Thus, there is a need for a poly(hydroxyalkanoic acid) containing composition that not only has desirable toughness and dimensional stability, but that also has adequate stretchability, especially when in the form of a Rapidly Quenched Sheet.

SUMMARY OF THE INVENTION

The present invention is directed to a composition comprising about 50 to about 99.5 wt % of a poly(hydroxyalkanoic acid), about 0.1 to about 40 wt % of an ethylene ester copolymer, and about 0.05 to about 5 wt % of an aliphatic carboxylic acid amide, based on the total weight of the composition, wherein the ethylene ester copolymer comprises (a) about 20 to about 95 wt % of copolymerized units of ethylene, (b) about 0.5 to about 25 wt % of copolymerized units of at least one ester of the formula $CH_2=C(R^1)CO_2R^2$, wherein $R^1$ is hydrogen or an alkyl group having 1-6 carbon atoms, and $R^2$ is a glycidyl group, based on the total weight of the ethylene ester copolymer and (c) 0 to about 70 wt % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms.

In one particular embodiment, the composition comprises about 89 to about 99 wt % of poly(lactic acid), about 1 to about 10 wt % of terpolymer having copolymerized units of ethylene, butyl acrylate, and glycidyl methacrylate and about 0.25 to about 1 wt % of behenamide, based on the total weight of the composition.

The invention is further directed to shaped articles comprising or produced from the composition described above.

DETAILED DESCRIPTION OF THE INVENTION

The compositions of the invention are thermoplastic compositions that are tough, dimensionally stable poly(hydroxyalkanoic acid) compositions (also referred to in the art as polyhydroxyalkanoate compositions) that exhibit enhanced stretchability properties. The compositions comprise poly (hydroxyalkanoic acid), an ethylene ester copolymer, and an aliphatic carboxylic acid amide. Articles comprising or made of such thermoplastic compositions are also included in the invention.

As discussed above, it is known to add ethylene ester copolymers (e.g., ethylene/butyl acrylate/glycidyl methacrylate terpolymers) to poly(hydroxyalkanoic acid) compositions as impact modifiers to improve the toughness of the poly(hydroxyalkanoic acid) polymer when in the form of a Rapidly Quenched Sheet or a finished thermoformed article. In addition, it is known to add aliphatic carboxylic acid amides (e.g., behenamide) to poly(hydroxyalkanoic acid) compositions as nucleating agents to improve transparency. As demonstrated by this invention, however, when both ethylene ester copolymers and the aliphatic carboxylic acid amides are present in the poly(hydroxyalkanoic acid) compositions, the stretchability of the compositions is unexpectedly enhanced, especially when the compositions are in the form of Rapidly Quenched Sheets.

Stretchability of the polymer compositions is determined by measuring the percent elongation at break of a sheet made of the polymer composition to be tested. In particular, the "percent elongation at break" refers to the difference between the length of the film at the time of film rupture under an applied force and the length of the film in its undeformed or unstrained state, divided by the length of the film in its undeformed or unstrained state. In the present invention, the percent elongation at break is measured in accordance with ASTM D-638.

In accordance with the present invention, the addition of the ethylene ester copolymer and the aliphatic carboxylic acid amide can increase the percent elongation at break of a poly (hydroxyalkanoic acid) composition by at least two-fold, preferably about two-fold to about twenty-five-fold when the composition is in the form of a Rapidly Quenched Sheet.

The poly(hydroxyalkanoic acids) or poly(hydroxyalkanoic acid) polymers suitable for use in the compositions of the invention can be prepared by polymerization of hydroxyalkanoic acids having 2 to 7 carbon atoms. For example, the poly(hydroxyalkanoic acids) may be prepared by polymerization of 6-hydroxyhexanoic acid (also known as polycaprolactone (PCL)), 3-hydroxyhexanoic acid, 4-hydroxyhexanoic acid, or 3-hydroxyheptanoic acid. The poly(hydroxyalkanoic acids) are preferably derived from the polymerization of hydroxyalkanoic acids (or esters thereof) having 2 to 5 carbon atoms, such as, glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, or 5-hydroxyvaleric acid.

The poly(hydroxyalkanoic acids) useful as components of the compositions of the invention may be homopolymers or copolymers comprising at least one comonomer derived from a hydroxyalkanoic acid or a derivative thereof. By derivative is meant a hydroxyalkanoate or a cyclic dimer (e.g., a lactide dimer) derived from the reaction between two hydroxyalkanoic acids. Blends of such polymers are also useful in the practice of the invention.

For example, the poly(hydroxyalkanoic acid) polymer may be a blend of copolymers of such as poly(hydroxybutyric acid-hydroxyvaleric acid) copolymers and poly(glycolic acid-lactic acid) copolymers. Such copolymers can be prepared by catalyzed copolymerization of a poly(hydroxyalkanoic acid) or derivative with one or more comonomers derived from cyclic esters and/or dimeric cyclic esters. Such esters may include glycolide (1,4-dioxane-2,5-dione); the dimeric cyclic ester of glycolic acid; lactide (3,6-dimethyl-1,4-dioxane-2,5-dione); $\alpha,\alpha$-dimethyl-$\beta$-propiolactone; the cyclic ester of 2,2-dimethyl-3-hydroxy-propanoic acid; $\beta$-butyrolactone; the cyclic ester of 3-hydroxybutyric acid; $\delta$-valerolactone; the cyclic ester of 5-hydroxypentanoic acid; $\epsilon$-pro-lactone; the cyclic ester of 6-hydroxyhexanoic acid; the lactone of the methyl substituted derivatives of 6-hydroxyhexanoic acid (such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, and etc.); the cyclic ester of 12-hydroxy-dodecanoic acid and 2-p-dioxanone; and the cyclic ester of 2-(2-hydroxyethyl)-glycolic acid.

The poly(hydroxyalkanoic acid) polymers may also be copolymers of one or more hydroxyalkanoic acid monomers or derivatives with other comonomers, such as aliphatic and aromatic diacid and diol monomers (e.g., succinic acid, adipic acid, terephthalic acid, ethylene glycol, 1,3-propanediol, and 1,4-butanediol).

Preferably, the poly(hydroxyalkanoic acid) is selected from poly(glycolic acid), poly(lactic acid) (PLA), poly(hydroxybutyrate) and combinations of two or more of these polymers. More preferably, the poly(hydroxyalkanoic acid) is a poly(lactic acid) having a number average molecular weight ($M_n$) of about 3,000 to about 1,000,000. Preferably $M_n$ is about 10,000 to about 700,000, more preferably about 20,000 to about 600,000.

The poly(lactic acid) may be a homopolymer or a copolymer containing at least about 50 mol %, or at least about 70 mol %, of copolymerized units derived from lactic acid or derivatives thereof. The poly(lactic acid) homopolymers or copolymers can be prepared from the two optical monomers D-lactic acid and L-lactic acid, or a mixture thereof (including a racemic mixture thereof). The poly(lactic acid) copolymer may be a random copolymer or a block copolymer or a stereo block copolymer or a stereo complex between optical blocks. For example, the poly(lactic acid) copolymer may be the stereo complex of about 50% of poly(D-lactic acid) and about 50% of poly(L-lactic acid).

The poly(hydroxyalkanoic acid) may be prepared by any suitable process. For example, the poly(hydroxyalkanoic acid) may be prepared by a) a direct dehydration-polycondensation process which involves the dehydration and condensation of the hydroxyalkanoic acid(s) in the presence of an organic solvent and catalyst (see e.g., U.S. Pat. Nos. 5,310,865 and 5,401,796); b) an indirect polymerization process which involves the dehydration of the hydroxyalkanoic acid(s) into cyclic dimers thereof and the ring-opening polymerization of the cyclic dimers (see e.g., U.S. Pat. No. 2,703,316); or c) the reaction of two or more homopolymers of poly(hydroxyalkanoic acid) in the presence of an organic solvent (see e.g., European Patent Publication No. 712880A2).

Poly(hydroxyalkanoic acid) polymers may also be synthesized in vivo by living organisms or isolated from plant matter. Numerous microorganisms have the ability to accumulate intracellular reserves of poly(hydroxyalkanoic acid) polymers. For example, the copolymer of poly(3-hydroxybutyrate-co-3-hydroxyvalerate) (PHB/V) has been produced by fermentation by the bacterium *Ralstonia eutropha*. Fermentation and recovery processes for other types of poly(hydroxyalkanoic acid) polymers have also been developed using a range of bacteria including *Azotobacter, Alcaligenes latus, Comamonas* testosterone and genetically engineered *E. coli* and *Klebsiella*. U.S. Pat. No. 6,323,010 discloses a number of poly(hydroxyalkanoic acid) polymers prepared from genetically modified organisms.

The ethylene ester copolymers useful as components of the compositions of the invention are polymers prepared by polymerization of ethylene and one or more ester comonomer(s). The ester comonomers include esters of unsaturated acids having the formula (a) $CH_2=C(R^1)CO_2R^2$, where $R^1$ is hydrogen or an alkyl group having 1-6 carbon atoms and $R^2$ is a glycidyl group. Optionally present is comonomer (b) $CH_2=C(R^3)CO_2R^4$, where $R^3$ is hydrogen or an alkyl group having 1-8 carbon atoms and $R^4$ is an alkyl group having 1-8 carbon atoms. For example, ester comonomer (b) can be methyl, ethyl, or butyl methacrylate. Other useful ester comonomers include one or more of n-butyl acrylate, tert-butyl acrylate, iso-butyl acrylate, and sec-butyl acrylate.

The ethylene ester copolymers may also be created by graft-copolymerization of the ester comonomer onto a previously polymerized ethylene copolymer.

The ethylene ester copolymer may comprise about 20 to about 95 wt %, about 20 to about 90 wt %, about 40 to about 90 wt %, or about 50 to about 80 wt %, of copolymerized units of ethylene based on the total weight of the ethylene ester copolymer. The ethylene ester copolymer may comprise about 0.5 to about 25 wt %, about 2 to about 20 wt %, or about 3 to about 17 wt %, of copolymerized units of an ester comonomer of formula (a), based on the total weight of the ethylene ester copolymer. The ethylene ester copolymer may also comprise up to about 70 wt %, preferably about 3 to about 70 wt %, more preferably about 3 to about 40 wt %, even more preferably about 15 to about 35 wt %, and most preferably about 20 to about 35 wt %, of copolymerized units of an ester comonomer of formula (b) based on the total weight of the ethylene ester copolymer. However, in certain embodiments, because the ester comonomer of formula (b) is optional it will not be present in the copolymer and the ethylene ester copolymers may be derived from the polymerization of ethylene and an ester comonomer of formula (a).

Specific examples of the ethylene ester copolymers useful as components of the compositions of the invention include terpolymers produced by the copolymerization of ethylene, butyl acrylate, and glycidyl methacrylate, which are referred to as EBAGMA, and dipolymers produced by the copolymerization of ethylene and glycidyl methacrylate. Additional comonomers may be present as copolymerized units in the ethylene copolymers. That is, the copolymers may be dipolymers, terpolymers or higher order copolymers. For example, the ethylene ester copolymers may additionally comprise other comonomers such as carbon monoxide. When present, copolymerized units of carbon monoxide generally will comprise up to about 20 wt %, or about 3 to about 15 wt % of the total weight of the ethylene ester copolymer.

The ethylene ester copolymers may be prepared by any suitable process. In particular, the ethylene ester copolymers may be prepared by polymerization of the foregoing monomers in the presence of a free-radical polymerization initiator at elevated temperatures (e.g., about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372; 3,756, 996; 5,532,066; 5,543,233; and 5,571,878). The ethylene ester copolymers may be homogeneous or not. For example, the ethylene ester copolymers may not be homogeneous in terms of concentration of monomer units along the polymer chain due to imperfect mixing during polymerization or variable monomer concentrations during the course of the polymerization.

The aliphatic carboxylic acid amides suitable for use as a third component of the compositions of the invention are amides of aliphatic carboxylic acids wherein the acid has 10 to 30 carbon atoms, preferably 12 to 28 carbon atoms, more preferably 16 to 26 carbon atoms, and most preferably 18 to 22 carbon atoms.

Aliphatic carboxylic acid amides which can be used in the invention include, but are not limited to a) aliphatic monocarboxylic acid amides (e.g., lauramide, palmitamide, oleamide, stearamide, erucamide, behenamide, ricinolamide, hydroxystearamide), b) N-substituted aliphatic monocarboxylic acid amides (e.g., N-oleylpalmitamide, N-oleyloleamide, N-oleylstearamide, N-stearyloleamide, N-stearylstearamide, N-stearylerucamide, methylolstearamide, methylolbehenamide), c) aliphatic carboxylic acid bisamides (e.g., methylenebisstearamide, ethylenebislauramide, ethylenebiscapramide, ethylenebisoleamide, ethylenebisstearamide, ethylenebiserucamide, ethylenebisbehenamide, ethylenebisisostearamide, ethylenebishydroxystearamide, butylenebisstearamide, hexamethylenebisoleamide, hexamethylenebisstearamide, hexamethylenebisbehenamide, hexamethylenebis hydroxystearamide, m-xylylenebisstearamide, m-xylylenebis-12-hydroxystearamide), d) N-substituted aliphatic carboxylic acid bisamides (e.g., N,N'-dioleylsebacamide, N,N'-dioleyladipamide, N,N'-distearyladipamide, N,N'-distearylsebacamide), and e) N-substituted ureas (e.g., N-butyl-N'-stearylurea, N-propyl-N'-stearylurea, N-allyl-N'-stearylurea, N-phenyl-N'-stearylurea, xylylenebisstearylurea, tolylenebisstearylurea, hexamethylenebisstearylurea, diphenylmethanebisstearylurea, diphenylmethanebislaurylurea). These aliphatic carboxylic acid amides can be used singly or as a mixture.

The aliphatic carboxylic acid amide is preferably an aliphatic monocarboxylic acid amide. More preferably, the aliphatic carboxylic acid amide is selected from behenamide and stearamide. Most preferably, the aliphatic carboxylic acid amide is behenamide.

The poly(hydroxyalkanoic acid) compositions of the invention comprise about 50 to about 99.5 wt % of a poly (hydroxyalkanoic acid), about 0.1 to about 40 wt % of at least one ethylene ester copolymer, and about 0.05 to about 5 wt % of an aliphatic carboxylic acid amide, based on the total weight of the composition. Due to the addition of the ethylene ester copolymer and the aliphatic carboxylic acid amide, such poly(hydroxyalkanoic acid) compositions possess not only desirable toughness or dimensional stability but also greatly improved stetchability, especially when in the form of a Rapidly Quenched Sheet.

Preferably, the poly(hydroxyalkanoic acid) compositions of the invention comprise about 65 to about 99 wt %, or about 67 to about 99 wt %, or about 89 to about 99 wt %, of the poly(hydroxyalkanoic acid), based on the total weight of the composition. It is also preferred that the ethylene ester copolymer or copolymers be present in the poly(hydroxyalkanoic acid) composition at a level of about 0.1 to about 30 wt %, or about 0.5 to about 20 wt %, or about 1 to about 10 wt %, based on the total weight of the composition. It is preferred that the aliphatic carboxylic acid amide is present in the poly(hydroxyalkanoic acid) composition at a level of about 0.1 to about 3 wt %, or about 0.25 to about 1 wt %, based on the total weight of the composition.

The compositions may also optionally further comprise other additives in amounts depending on the particular use. For example, the following additive levels are generally useful: about 0.5 to about 7 wt % of plasticizer; about 0.1 to about 2 wt % of antioxidants and stabilizers; about 0.5 to about 30 wt % of fillers; about 5 to about 40 wt % of reinforcing agents; and/or about 1 to about 30 wt % of flame retardants, based on the total weight of the composition. Examples of suitable fillers include glass microspheres or carbon black and minerals such as talc, and wollastonite.

The poly(hydroxyalkanoic acid) compositions of the invention may be prepared by melt blending the poly(hydroxyalkanoic acid), the ethylene ester copolymer or copolymers, and the aliphatic carboxylic acid amide components until they are homogeneously dispersed to a degree such that particles of any component polymer are not observed visually and no laminar morphology is formed when the composition is injection molded to form an article. If other additional additive materials are present they will preferably also be uniformly dispersed in the blend of poly(hydroxyalkanoic acid), ethylene ester copolymer and aliphatic carboxylic acid amide. Any melt-blending method known in the art may be used provided care is taken not to subject the composition to conditions that result in excessively high shear rates or localized long hold-up times because such conditions may result in generation of temperatures sufficient to decompose the poly (hydroxyalkanoic acid). For example, the composition may be prepared by 1) mixing all the component materials until homogeneous using a melt-mixer such as a single-screw extruder, twin-screw extruder that does not subject the composition to excessive shear, blender, kneader, Banbury mixer or roll mixer or 2) mixing a portion of the component materials in a melt-mixer followed by further addition and melt mixing of the remaining of the component materials until a homogeneous composition is obtained.

The invention further provides articles comprising or produced from the poly(hydroxyalkanoic acid) compositions of the invention. Such articles may be formed using one of a number of suitable melt-processing techniques, which include, but are not limited to, injection molding, cast extrusion, extrusion blow molding, injection stretch blow molding, calendaring and spinning.

The poly(hydroxyalkanoic acid) articles may be of any shape or size. They include, but are not limited to, injection molded articles, bags, tubes, cups, bottles, trays, bowls, films, sheets, and filaments.

The poly(hydroxyalkanoic acid) articles may be used in a broad range of applications. For example, they may be used as thermoformed packaging articles for food (e.g., clam-shells for protecting lettuces and sandwiches, cups for holding beverages, and trays for holding meats), injection molded jars for cosmetics, or stamped blister packages for medicine. The poly(hydroxyalkanoic acid) compositions may also be formed into non-structural and non-packaging articles for instrument housings or structural articles for ribbings. In addition, the films or sheets formed from the poly(hydroxyalkanoic acid) composition may be laminated with other materials by adhesive lamination or heat lamination to form multi-layer structures.

EXAMPLES

Comparative Examples CE1, CE2 and CE3 and Example E1

I. Materials

PLA: NatureWorks® 2002D, a poly(lactic acid) polymer available from NatureWorks LLC, Minnetonka, Minn.

behenamide: Crodamide® BR, a behenamide additive available from Croda Inc, Edison, N.J.

EBAGMA: an autoclave produced ethylene/n-butyl acrylate/glycidyl methacrylate terpolymer (monomer ratio 66.75 wt % ethylene, 28 wt % n-butyl acrylate, 5.25 wt % glycidyl methacrylate, Melt Index 12 dg/minute, 190° C., 2.16 kg load, melting range 50° C. to 80° C.).

II. PLA Composition Preparation

Shown in Table 1 are four compositions that were prepared from the components listed above by melt blending the ingredients using a Haake mixer (Model 9000 Plastograph) for 6 minutes at 210° C. and 125 rpm rotor speed under a nitrogen blanket.

TABLE 1

| Sample | CE1 | CE2 | CE3 | E1 |
|---|---|---|---|---|
| PLA (g) | 100 | 53.9 | 53.9 | 52.9 |
| Behenamide (g) | — | 1.1 | — | 1.1 |
| EBAGMA (g) | — | — | 1.1 | 1.1 |

III. Film Formation and Testing

Rapidly Quenched Sheets and heat treated films were prepared from the compositions of CE1-3 and E1 by compression molding.

Rapidly Quenched Sheets having a uniform thickness of 10 mils (0.25 mm) and dimensions of 2×2 in (5.1×5.1 cm) were prepared by compressing the PLA compositions between sheets of smooth aluminum foil in a press at a temperature between 190° C. and 200° C. and a pressure of about 6000 psi (414 bar). The foil/film structures were transferred to a cooling mold maintained at 22° C. for fast quenching. Heat treated sheets were formed by maintaining the thus-formed Rapidly Quenched Sheets overnight at 107° C. in a nitrogen-blanketed oven.

The percent elongation at break of the sheets was measured according to ASTM D-638 using an Instron Series IX instrument (Instron Corp, Norwood, Mass.). Specimens were in a Type IV shape with "w" at 0.18 in (0.46 cm), "L" at 0.5 in (1.27 cm), and "L0" at 1.5 in (0.38 cm) and the test speed was 2 in/min (5.1 cm/min).

Results are tabulated in Table 2, where the average percent elongation at break for CE1 was the result of three tests and the average percent elongation at break for CE2-3 and E1 was the result of eight tests.

The data indicate that the percent elongation at break remains substantially the same when behenamide is added to the poly(lactic acid) compositions. The percent elongation at break of the poly(lactic acid) composition increased by 260% and 690% in the heat treated and Rapidly Quenched Sheet samples, respectively, when EBAGMA was added to the composition. The percent elongation at break for the poly(lactic acid) composition increased by 364% and 2552% in the heat treated and Rapidly Quenched Sheet samples, respectively, when both behenamide and EBAGMA were added to the composition.

TABLE 2

|  | CE1 | CE2 | CE3 | E1 |
|---|---|---|---|---|
| Elongation at Break, % Heat Treated Sheet |  |  |  |  |
| Sample 1 | 1.9 | 2.7 | 11.6 | 7.6 |
| Sample 2 | 2.4 | 2.8 | 7.5 | 5.2 |
| Sample 3 | 1.6 | 2.9 | 3.2 | 15.7 |
| Sample 4 | — | 2.7 | 4.7 | 11.5 |
| Sample 5 | — | 2.8 | 8.1 | 6.9 |
| Sample 6 | — | 5.1 | 4.1 | 13.1 |
| Sample 7 | — | 3 | 4.2 | 3.9 |
| Sample 8 | — | 1.7 | 14.4 | 10.3 |
| Average Value | 2.0 | 2.96 | 7.23 | 9.28 |
| Standard Deviation | 0.4 | 0.95 | 4.02 | 4.07 |
| Standard Deviation % | 50 | 32 | 55 | 43 |
| Elongation at Break, % Rapidly Quenched Sheet |  |  |  |  |
| Sample 1 | 3.1 | 9.8 | 2.9 | 213 |
| Sample 2 | 3.6 | 7.1 | 2.7 | 2.9 |
| Sample 3 | 2.8 | 10.8 | 2.8 | 3.4 |
| Sample 4 | — | 2.5 | 181 | 70 |
| Sample 5 | — | 8.1 | 2.7 | 7.4 |
| Sample 6 | — | 2.4 | 2.3 | 3.1 |
| Sample 7 | — | 1.5 | 2.7 | 160 |
| Sample 8 | — | 2.3 | 5.2 | 219 |
| Average Value | 3.2 | 5.56 | 25.29 | 84.85 |
| Standard Deviation | 0.4 | 3.79 | 62.92 | 97.33 |
| Standard Deviation % | 12 | 68 | 248 | 114 |

Comparative Example CE4 and Example 2

I. Materials

PLA: NatureWorks® 2002D, a poly(lactic acid) polymer, available from NatureWorks LLC, Minnetonka, Minn.

stearamide: octadecanamide available from Sigma-Aldrich Corp, St. Louis, Mo.

EBAGMA: an autoclave produced ethylene/n-butyl acrylate/glycidyl methacrylate terpolymer (monomer ratio 66.75 wt % ethylene, 28 wt % n-butyl acrylate, 5.25 wt % glycidyl methacrylate, melt index 12 dg/minute, 190° C., 2.16 kg load, melting range 50° C. to 80° C.).

II. PLA Composition Preparation

Using the same melt blending procedure as described for Examples CE1-3 and E1, two PLA compositions (CE4 and E2) were prepared from the ingredients shown in Table 3.

TABLE 3

| Sample | CE4 | E2 |
|---|---|---|
| PLA (lb) | 4 | 3.9 |
| Stearamide (lb) | — | 0.08 |
| EBAGMA (lb) | 0.08 | 0.08 |

III. Film Formation and Testing

Using the same compression molding process described above for Examples CE1, CE2, CE3 and E1, Rapidly Quenched Sheet and heat treated sheets having a thickness of 22 mils (0.56 mm) were prepared from the compositions of CE4, and E2 and their percent elongation at break was determined according to ASTM D-638, as described above. Results are tabulated in Table 4.

In comparison to the poly(lactic acid) composition containing only EBAGMA as an additive (CE4), the presence of EBAGMA in E2 (the composition containing both EBAGMA and stearamide) did not affect the percent elongation at break in the heat treated samples. However, in the Rapidly Quenched Sheet samples, the presence of stearamide in E2 increased the percent elongation at break of the composition by 200%.

TABLE 4

| | CE4 | E2 |
|---|---|---|
| Rapidly Quenched Sheet: | | |
| % Elongation at Break (Average) | 4 | 12 |
| % Elongation at Break (Maximum of 3 samples) | 5 | 24 |
| Heat Treated Sheet: | | |
| % Elongation at Break (Average) | 13 | 10 |
| % Elongation at Break (Maximum of 3 samples) | 17 | 16 |

What is claimed is:

1. A composition comprising about 50 to about 99.5 wt % of a poly(hydroxyalkanoic acid), about 0.1 to about 40 wt % of an ethylene ester copolymer, and about 0.05 to about 5 wt % of an aliphatic carboxylic acid amide, based on the total weight of the composition, wherein the ethylene ester copolymer comprises (a) about 20 to about 95 wt % of copolymerized units of ethylene, (b) about 0.5 to about 25 wt % of copolymerized units of at least one ester of the formula $CH_2=C(R^1)CO_2R^2$, wherein $R^1$ is hydrogen or an alkyl group having 1-6 carbon atoms, and $R^2$ is glycidyl, based on the total weight of the ethylene ester copolymer and (c) 0 to about 70 wt % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms, based on the total weight of the ethylene ester copolymer.

2. A composition of claim 1, wherein the poly(hydroxyalkanoic acid) comprises polymerized units of one or more hydroxyalkanoic acids selected from the group consisting of 6-hydroxyhexanoic acid, 3-hydroxyhexanoic acid, 4-hydroxyhexanoic acid, 3-hydroxyheptanoic acid, glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, and 5-hydroxyvaleric acid.

3. A composition of claim 1, wherein the poly(hydroxyalkanoic acid) is selected from the group consisting of poly (glycolic acids), poly(lactic acids), poly(hydroxybutyric acids), poly(hydroxybutyric acid-hydroxyvaleric acid) copolymers, and poly(glycolic acid-lactic acid) copolymers.

4. A composition of claim 3, wherein the poly(hydroxyalkanoic acid) is poly(lactic acid).

5. A composition of claim 4, wherein the poly(lactic acid) is a stereo complex of poly(D-lactic acid) and poly(L-lactic acid).

6. A composition of claim 1, wherein the ethylene ester copolymer comprises (a) about 40 to about 90 wt % of copolymerized units of ethylene, (b) about 3 to about 20 wt % of copolymerized units of one or more esters of the formula $CH_2=C(R^1)CO_2R^2$, wherein $R^1$ is hydrogen or an alkyl group having 1-6 carbon atoms, and $R^2$ is glycidyl and (c) about 3 to about 70 wt % of copolymerized units of one or more esters of the formula $CH_2=C(R^3)CO_2R^4$, wherein $R^3$ is hydrogen or an alkyl group having 1 to 8 carbon atoms and $R^4$ is an alkyl group having 1 to 8 carbon atoms, based on the total weight of the ethylene ester copolymer.

7. A composition of claim 6, wherein the ethylene ester copolymer comprises (a) about 50 to about 80 wt % of copolymerized units of ethylene, (b) about 3 to about 17 wt % of copolymerized units of one or more esters of the formula $CH_2=C(R^1)CO_2R^2$, wherein $R^1$ is hydrogen or an alkyl group having 1-6 carbon atoms, and $R^2$ is glycidyl, and (c) about 20 to about 35 wt % of copolymerized units of one or more esters of the formula $CH_2=C(R^3)CO_2R^4$, wherein $R^3$ is hydrogen or an alkyl group having 1 to 8 carbon atoms and $R^4$ is an alkyl group having 1 to 8 carbon atoms, based on the total weight of the ethylene ester copolymer.

8. A composition of claim 1, wherein the ethylene ester copolymer is selected from the group consisting of ethylene/glycidyl methacrylate copolymers, ethylene/butyl acrylate/glycidyl methacrylate terpolymers, and mixtures thereof.

9. A composition of claim 8, wherein the ethylene ester copolymer is an ethylene/butyl acrylate/glycidyl methacrylate terpolymer.

10. A composition of claim 1, wherein the aliphatic carboxylic acid amide is an amide of an aliphatic carboxylic acid having 10 to 30 carbon atoms.

11. A composition of claim 10, wherein the aliphatic carboxylic acid has 16 to 26 carbon atoms.

12. A composition of claim 10, wherein the aliphatic carboxylic acid amide is selected from the group consisting of aliphatic monocarboxylic acid amides, N-substituted aliphatic monocarboxylic acid amides, aliphatic carboxylic acid bisamides, N-substituted aliphatic carboxylic acid bisamides, and N-substituted ureas and mixtures thereof.

13. A composition of claim 10, wherein the aliphatic carboxylic acid amide is behenamide.

14. A composition of claim 1 which comprises about 67 to about 99 wt % of the poly(hydroxyalkanoic acid), about 0.5 to about 20 wt % of the ethylene ester copolymer, and about 0.1 to about 3 wt % of the aliphatic carboxylic acid amide, based on the total weight of the composition.

15. A composition of claim 1 which comprises about 89 to about 99 wt % of poly(lactic acid), about 1 to about 10 wt % of ethylene/butyl acrylate/glycidyl methacrylate terpolymer and about 0.25 to about 1 wt % of behenamide, based on the total weight of the composition.

16. A shaped article comprising a composition comprising about 50 to about 99.5 wt % of a poly(hydroxyalkanoic acid), about 0.1 to about 40 wt % of an ethylene ester copolymer, and about 0.05 to about 5 wt % of an aliphatic carboxylic acid amide, based on the total weight of the composition, wherein the ethylene ester copolymer comprises (a) about 20 to about 95 wt % of copolymerized units of ethylene, (b) about 0.5 to about 25 wt % of copolymerized units of at least one ester of the formula $CH_2=C(R^1)CO_2R^2$, wherein $R^1$ is hydrogen or an alkyl group having 1-6 carbon atoms, and $R^2$ is glycidyl, based on the total weight of the ethylene ester copolymer and (c) 0 to about 70 wt % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms, based on the total weight of the ethylene ester copolymer.

17. An article of claim 16, wherein the poly(hydroxyalkanoic acid) is poly(lactic acid).

18. An article of claim 16, wherein the ethylene ester copolymer is an ethylene/butyl acrylate/glycidyl methacrylate terpolymer.

19. An article of claim 16, wherein the aliphatic carboxylic acid amide is behenamide.

20. An article of claim 16, wherein the composition comprises about 89 to about 99 wt % of poly(lactic acid), about 1 to about 10 wt % of ethylene/butyl acrylate/glycidyl methacrylate terpolymer and about 0.25 to about 1 wt % of behenamide, based on the total weight of the composition.

21. A shaped article comprising a composition comprising about 50 to about 99.5 wt % of a poly(hydroxyalkanoic acid), about 0.1 to about 40 wt % of an ethylene ester copolymer, and about 0.05 to about 5 wt % of an aliphatic carboxylic acid amide, based on the total weight of the composition, wherein the ethylene ester copolymer comprises (a) about 20 to about 95 wt % of copolymerized units of ethylene, (b) about 0.5 to about 25 wt % of copolymerized units of at least one ester of the formula $CH_2=C(R^1)CO_2R^2$, wherein $R^1$ is hydrogen or an alkyl group having 1-6 carbon atoms, and $R^2$ is glycidyl, based on the total weight of the ethylene ester copolymer and (c) 0 to about 70 wt % of copolymerized units of at least one ester of the formula $CH_2=C(R^3)CO_2R^4$, wherein $R^3$ is hydrogen or an alkyl group having 1 to 8 carbon atoms and $R^4$ is an alkyl group having 1 to 8 carbon atoms, based on the total weight of the ethylene ester copolymer, prepared by a process selected from the group consisting of molding processes, extrusion processes, thermoforming processes and mixtures thereof.

22. An article of claim 16, wherein the article is in the form of a Rapidly Quenched Sheet.

23. A Rapidly Quenched Sheet of claim 22 wherein the Rapidly Quenched Sheet is an oriented Rapidly Quenched Sheet.

24. A Rapidly Quenched Sheet of claim 22 having a thickness of less than 10 mils (0.25 mm).

25. A Rapidly Quenched Sheet of claim 24 that is an oriented Rapidly Quenched Sheet.

* * * * *